United States Patent
Harrington et al.

[11] Patent Number: 6,163,579
[45] Date of Patent: Dec. 19, 2000

[54] BROADBAND MODEM TRANSFORMER HYBIRD

[75] Inventors: Brian Harrington, West Groton; Scott Wurcer, Cambridge, both of Mass.

[73] Assignee: Analog Devices, Inc., Norwood, Mass.

[21] Appl. No.: 09/034,575

[22] Filed: Mar. 4, 1998

[51] Int. Cl.[7] .................................................. H04B 3/03
[52] U.S. Cl. ..................... 375/257; 375/258; 333/117; 333/120
[58] Field of Search .................................... 375/257, 258; 333/117, 120; 379/3, 345, 402, 403, 404, 394, 391, 392, 344

[56] References Cited

U.S. PATENT DOCUMENTS

| | | | |
|---|---|---|---|
| 2,499,423 | 3/1950 | Selinger | 379/402 |
| 3,441,684 | 4/1969 | McLeod | 379/392 |
| 3,517,138 | 6/1970 | Burger | 379/394 |
| 3,711,660 | 1/1973 | Cherry | 379/403 |
| 4,103,118 | 7/1978 | Bergman | 379/403 |
| 4,238,645 | 12/1980 | Burger | 379/394 |
| 4,677,666 | 6/1987 | Herman | 379/392 |
| 5,528,630 | 6/1996 | Ashley et al. | 375/258 |
| 5,581,710 | 12/1996 | Noel, Jr. et al. | 340/825.05 |

FOREIGN PATENT DOCUMENTS

| | | | |
|---|---|---|---|
| 0746117 | 12/1996 | European Pat. Off. | H04B 3/03 |
| 3520708 | 3/1986 | Germany | H04B 3/03 |

*Primary Examiner*—Stephen Chin
*Assistant Examiner*—Paul Rupert
*Attorney, Agent, or Firm*—Samuels, Gauthier & Stevens, LLP

[57] ABSTRACT

A broadband modem hybrid transformer couples a broadband modem to a plain-old-telephone (POTs) line. The hybrid includes a full bridge having an impedance matching network to reduce the transhybrid attenuation of the hybrid. The second matching network(s) include various resistive and reactive components which together provide an impedance value selected based upon the impedance of the telephone line typically reflected into the primary windings of the transformer. The matching network increases the transhybrid attenuation of the hybrid, and thus reducing the amount of noise which couples from the modem transmit circuit to the modem receive circuit through the hybrid.

11 Claims, 7 Drawing Sheets

FIG. 2 - PRIOR ART

BROADBAND MODEM TRANSFORMER HYBIRD

TECHNICAL FIELD

The invention relates to the field of broadband modems, and in particular to a hybrid circuit which couples a broadband modem to a plain-old-telephone line.

BACKGROUND OF THE INVENTION

Due to the widespread popularity of the World Wide Web, internet traffic is at an all time high and rapidly increasing. The resulting congestion is taking its toll on users and telephone companies alike. Users are often frustrated by the length of time it takes to download complex graphics and videos. For example, a ten megabyte video clip which is the equivalent of a four minute movie, takes approximately ninety-three minutes using a 14.4 kilobyte modem and forty-six minutes using a 28.8 kilobyte modem.

In addition, lengthy data transmissions are tying up telephone company switches that were designed to handle brief telephone calls. Broadband modems, and in particular asymmetric digital subscriber line (ADSL) modems are an emerging technology which promises to dramatically increase the ability to transfer data over conventional telephone lines. Significantly, ADSL modems allow data transfers at rates over two hundred times faster than current modems, and over ninety times faster than ISDN lines.

ADSL was originally conceived of as a technology for delivering interactive multimedia services, such as video on demand over existing telephone networks. However, it is internet access that is currently driving the demand for ADSL. Unlike other high speed data transmission technologies such as ISDN, ADSL requires no massive rewiring or other changes to a telephone company's local exchange or central office. Notably, ADSL modems use the existing telephone infrastructure, including the so-called "last mile" of the network, which is the leg from the central office to a subscriber site (e.g., a home or office) which uses a twisted pair of copper lines. Although it is often referred to as the "last mile", the leg from the central office to the subscriber site is typically approximately 12,000–18,000 feet long.

The bandwidth of a conventional copper twisted pair telephone line is approximately 1 MHz. However, conventional analog signals which carry voice over these lines operate in a bandwidth which is only 4 KHz wide. Advantageously, ADSL takes advantage of the remaining portion of the 1 MHz. Specifically, ADSL technology effectively subdivides the 1 MHz bandwidth of the copper twisted pair line into three information channels: i) a high speed down stream channel, ii) a medium speed duplex (upstream/downstream) channel, and iii) a conventional voice channel. Downstream refers to transmissions from the telephone network to the ADSL modem located at a subscriber site, while upstream is the route from the subscriber site to the telephone network. This multichannel approach enables subscribers to access the internet, order a video for viewing and send a facsimile or talk on the telephone all at the same time.

FIG. 1 illustrates a communication system 10 which employs ADSL technology. The system 10 includes a subscriber site 12 which includes a phone 14, a facsimile machine 16 and a personal computer or computer network 18. The subscriber site 12 receives a twisted pair of copper telephone lines 20 which connect the subscriber site with a telephone central office 22. The run length of the telephone line 20 between the subscriber site and the central office 22 is typically between 12,000 and 18,000 feet. A POTS splitter 24 located at the subscriber site 12 is connected to the telephone line 20 and couples the telephone line to an ADSL modem 26 and to the phone 14 and facsimile machine 16.

Central office 22 includes a POTS splitter 30 which is operatively connected to an ADSL modem rack 32 and to a public telephone switch 34. As known, the public telephone switch 34 communicates over a public switch telephone network 36. The ADSL modem rack 32 also communicates over the public switch telephone network and is connected via an internet backbone 38 to various devices including a video server 40, a video conferencing server 42 and a World Wide Web server 44.

FIG. 2 is a functional block diagram illustration of the ADSL modem 26 and the POTs splitter 24. The modem 26 includes a hybrid circuit 50 which couples a transmit circuit 52 and a receive circuit 54 to the telephone line 20.

The transmit circuit 52 includes a digital signal processor (DSP) 56 which provides a digitized transmit signal on a line 58 to a digital-to-analog converter (DAC) 60. The resultant analog signal is input to a low pass filter (LPF) 62 and a filtered transmit signal is provided on a line 64 to the hybrid circuit 50.

The receive circuit 54 receives a signal on a line 66 and includes a high pass filter 68, a programmable gain amplifier 70, a low pass filter 72, an analog-to-digital converter (ADC) 74 and a DSP 76 which together process the signal on the line 66 in a known manner.

The POTs splitter 24 includes a high pass filter 78 and a LPF 80. The LPF 80 has a cut-off frequency set at approximately 4 KHz in order to allow the voice band signal to pass onto the line 28. A problem with this system architecture is that the HPF 78 filters signals which are being transmitted and received by the modem. Therefore, the cut-off frequency of the HPF 78 can be set at no higher than about 30 kHz to ensure that signals from the transmit circuit 52 pass relatively unattenuated through the POTs splitter. In addition, the hybrid 50 is typically used to terminate the HPF 78 in this embodiment.

A problem in prior art hybrids is that an excessive portion of the signal from the transmit circuit 52 undesirably couples to the receive circuit 54 through the hybrid 50 as noise. A measure of the amount of transmit signal power which couples to the receive signal is "transhybrid attenuation". If the transhybrid attenuation is too low, the signal-to-noise ratio (SNR) of the receive circuit decreases in part because the dynamic range of the ADC 74 in the receive circuit 54 decreases. The severity of this problem increases since the power of the transmit signal on the line 64 is much greater than the power of the receive signal on the line 66. Therefore, there is a need for an improved hybrid for coupling a broadband modem to a POTs line.

SUMMARY OF THE INVENTION

An object of the present invention is to provide a hybrid circuit which couples a broadband modem to a plain-old-telephone (POTs) line.

A further object of the present invention is to provide an ADSL modem having a hybrid circuit with improved transhybrid attenuation.

Briefly, according to the present invention, a hybrid circuit which couples a broadband modem to a telephone line includes a transformer bridge circuit including a first leg comprising a first impedance matching network connected between a first node and a second node, a second leg comprising a first primary winding connected between the first node and a third node, a third leg comprising a second impedance matching network connected between the third node and a fourth node, a fourth leg comprising a second primary winding connected between the second node and the fourth node. A drive amplifier applies a transmit signal across the first and fourth nodes, and a receive amplifier receives a receive signal between the second and third nodes. A secondary winding is electrically coupled to the telephone line and magnetically coupled to the first and second primary windings.

The first and second matching networks include various resistive and reactive components which together provide an impedance value selected based upon the impedance of the telephone line typically reflected into the primary windings of the transformer. In a preferred embodiment, the first and second matching networks have the same impedance, which is equal to the typical reflected line impedance.

According to another aspect of the invention, a hybrid circuit which couples a broadband modem to a telephone line comprises a bridge circuit which includes a first leg comprising a first primary winding of a first transformer connected between a first node and a second node, a second leg comprising a first primary winding of a second transformer connected between the first node and a third node, a third leg comprising a second primary winding of the first transformer connected between the third node and a fourth node, and a fourth leg comprising a second primary winding of the second transformer connected between the second node and the fourth node. A drive amplifier applies a transmit signal across the first and fourth nodes, and a receive amplifier receives a receive signal between the second and third nodes. A secondary winding of the first transformer is magnetically coupled to the first and second primary windings of the first transformer. A secondary winding of the second transformer is electrically coupled to the telephone line and magnetically coupled to the first and second primary windings of the second transformer. Significantly, an impedance matching network is coupled across the secondary winding of the first transformer.

The matching network includes various resistive and reactive components which together provide an impedance which is preferably equal to the impedance of the telephone line reflected into the primaries of the first transformer. In this embodiment, the impedance of the matching network appears across the primaries of the first transformer. An advantage of this embodiment is that since the matching network impedance is reflected into the first and second primary windings of the first transformer, these windings will effectively be identical. That is, since the components in the matching networks are used to generate a reflected impedance in both of the primaries, the parasitics of the matching network will be equally reflected into the primaries and effectively cancel.

According to yet another aspect of the invention, a hybrid circuit for coupling a broadband modem to a telephone line comprises a bridge circuit which includes a first leg comprising a first secondary winding of a first transformer connected between a first node and a second node, a second leg comprising an impedance matching network connected between the second node and a third node, and a third leg comprising a second secondary winding of the first transformer connected between the third node and a fourth node. The bridge circuit also includes a first primary winding of a second transformer connected between the second and fourth nodes, and a second primary winding of the second transformer connected between the first and third nodes. A drive amplifier applies a transmit signal across a primary winding of the first transformer which is magnetically coupled to the first and second secondary windings of the first transformer. The second primary winding of the second transformer is electrically coupled to the telephone line and magnetically coupled to a secondary of the second transformer. Wherein, a receive amplifier receives a receive signal across the secondary of the second transformer.

Advantageously, the matching network increases the transhybrid attenuation of the hybrid, and thus reducing the amount of noise which couples from the transmit circuit to the receive circuit through the hybrid.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
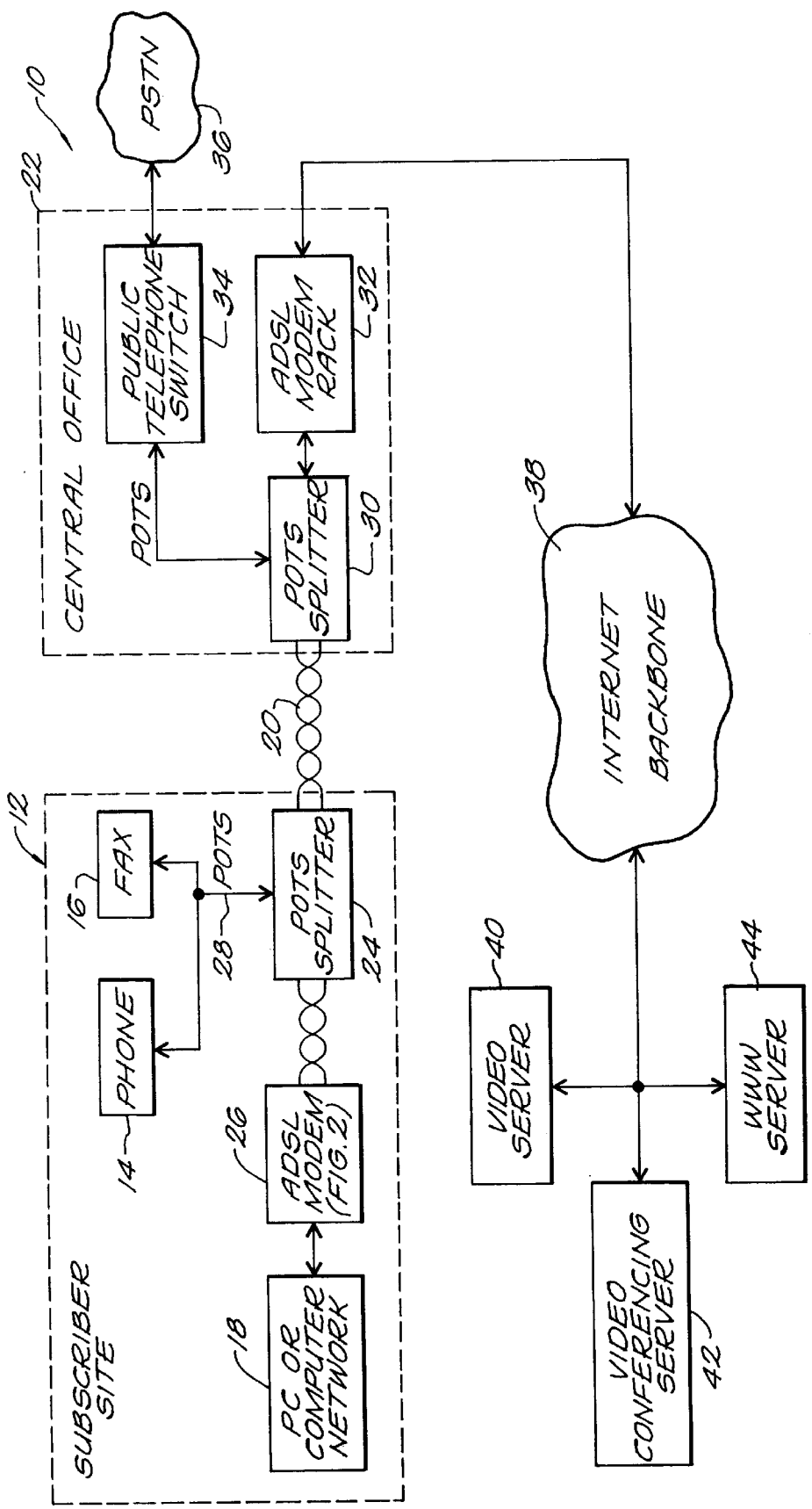
FIG. 1 is a functional block diagram illustration of a communications systems.
Figure 2:
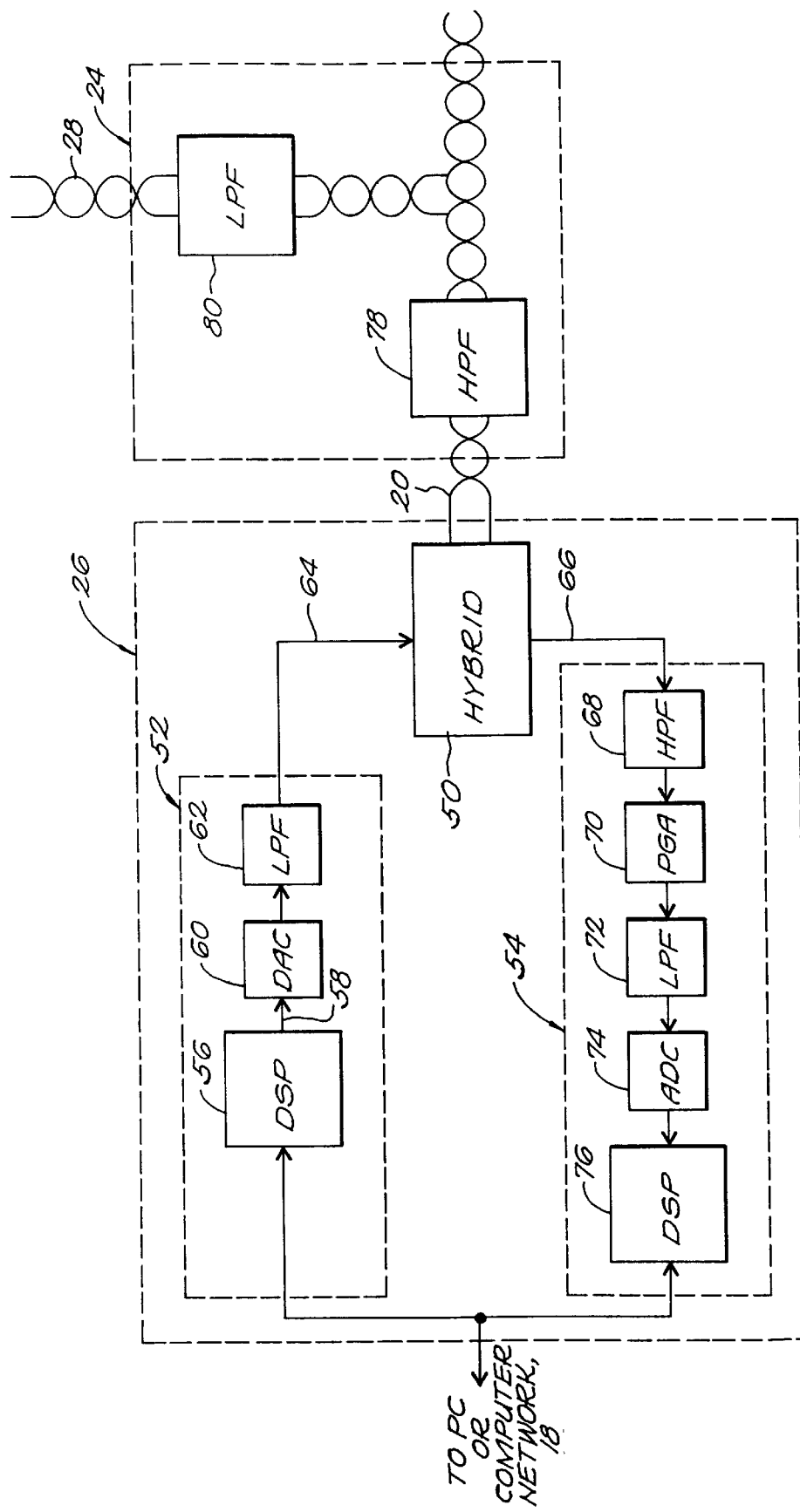
FIG. 2 is a functional block diagram illustration of a prior art ADSL modem and POTs splitter.
Figure 3:
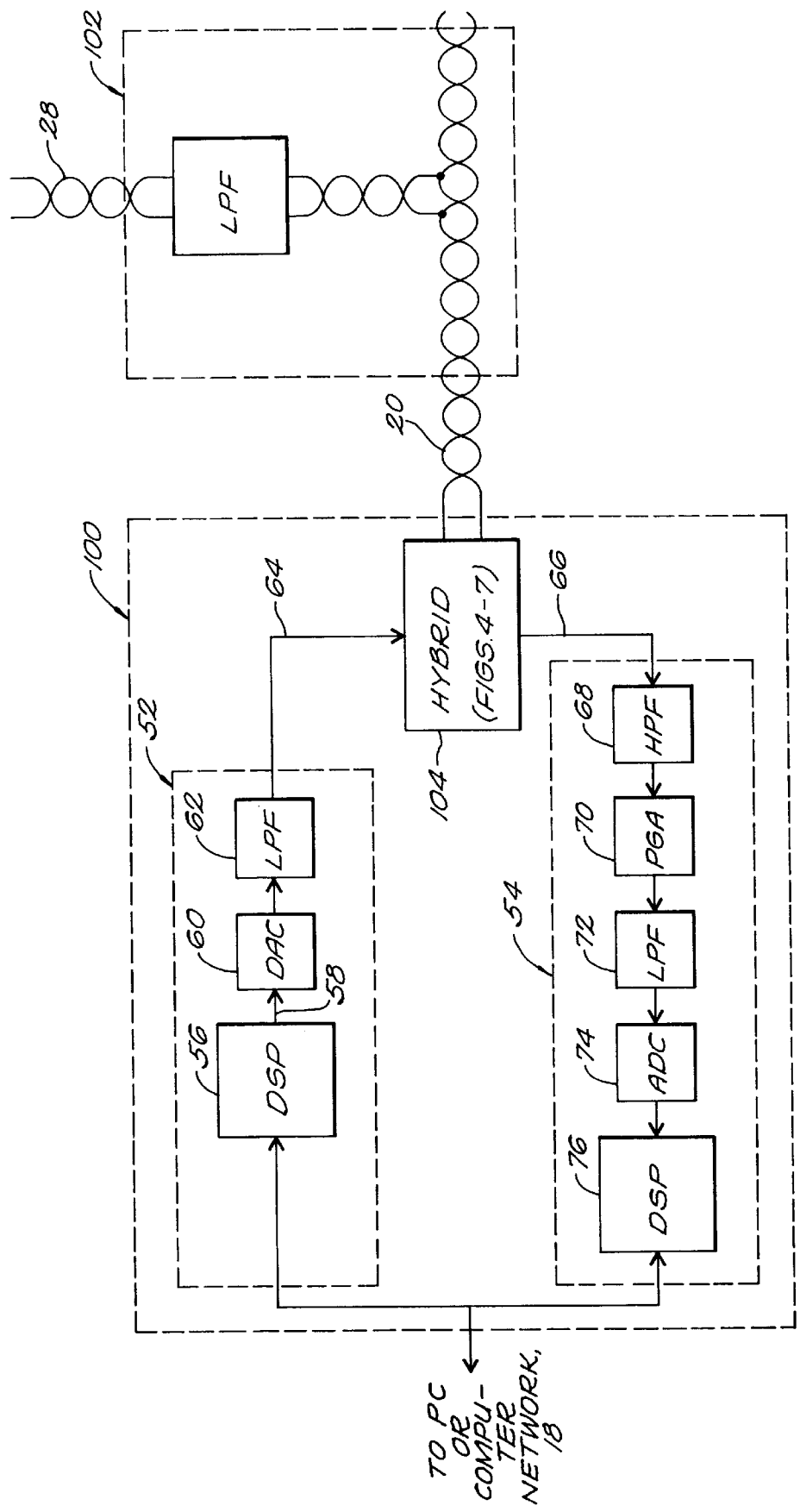
FIG. 3 is a functional block diagram illustration of an ADSL modem and POTs splitter.

FIG. 3 is a functional block diagram illustration of an ADSL modem 100 coupled to a POTs splitter 102. In the interest of clarity and brevity, elements which remain unchanged from the elements in FIG. 2 shall retain the same numerical designation. In addition, although the present invention shall be discussed in the context of an ADSL modem, it is contemplated that the invention will operate with any DSL format modem (e.g., HDSL, HDSL2, RADSL or VDSL).

The modem 100 includes a hybrid circuit 104 which couples the modem to the POTs line 20. Notably, the hybrid 104 according to the present invention facilitates removal of the HPF from the POTs splitter 102, in contrast to the POTs splitter 24 (FIG. 2). The details of the hybrid 104 shall now be discussed.

Figure 4:
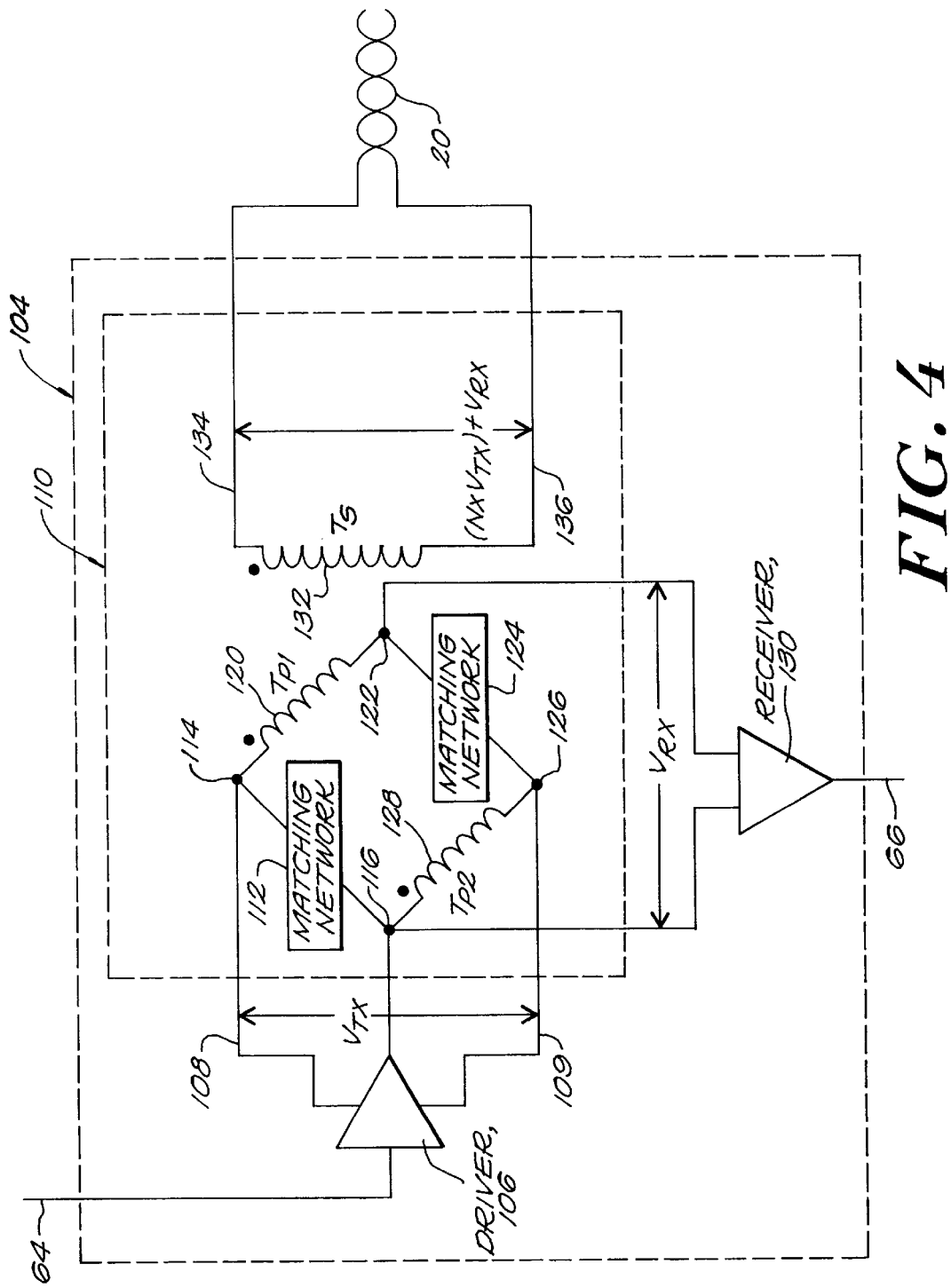
FIG. 4 is a schematic illustration of a hybrid according to the present invention.

Referring to FIG. 4, the hybrid circuit 104 includes a driver 106 which receives the filtered transmit signal on the line 64 and provides a differential signal $V_{tx}$ across lines 108, 109. The hybrid 104 also includes a transformer bridge circuit 110. This bridge circuit comprises a first leg comprising a first impedance matching network 112 connected between a first node 114 and a second node 116. A second leg includes a first primary winding 120 connected between the first node 114 and a third node 122. Third leg comprises a second impedance matching network 124 connected between the third node 122 and a fourth node 126, while a fourth leg of the bridge includes a second primary winding 128 connected between the second node 116 and the fourth node 126. The driver 106 applies the signals on the lines 108, 109 across the first and fourth nodes 114, 126 respectively. A receiver senses the voltage between the second and third nodes 116, 122 and provides the signal on the line 66 indicative thereof. Secondary winding 132 is electrically coupled to the telephone line 20 via lines 134, 136 and magnetically coupled to the first and second primary windings 120, 128.

The matching networks 112, 124 each have an impedance value which is preferably selected to be one-half of the line impedance as reflected into the primary windings 120, 128. For example, if the line impedance is simply resistive and of value R ohms, then the matching networks 112, 124 would be selected to each have a resistance of (R/2) ohms. However, in practice the impedance of the line is both resistive and reactive. Therefore, the matching networks 112, 124 will generally be complex networks and include passive resistive, capacitive and inductive components. Since the line impedance is highly dependent upon the subscriber site relative to the central office, it is virtually impossible to set the impedances of the matching networks equal to one-half the actual line impedance. Therefore, the impedance of the matching networks is generally selected based upon an industry known reference telephone line. In a preferred embodiment, the matching network characteristics are selected to match a telephone line with a relatively large attenuation so the hybrid provides its best attenuation performance when it is needed most (i.e., with a line with large attenuation).

The transformer formed by the primary windings 120, 128 and the secondary winding 132 has a turns ratio (N). For example, if N is equal to one, then the voltage across the secondary 132 will be $(V_{tx}+V_{rx})$, where $V_{rx}$ is the voltage received by the hybrid 104 via the POTs line 20. If the hybrid 110 receives $V_{rx}$ across lines 134, 136 then the voltage across nodes 116, 122 will also equal $V_{rx}$. That is, the full duplex hybrid 110 provides a transmit gain of unity, and a unity receive gain. Advantageously, this topology does not subject the transmit signal or the receive signal to any attenuation due to the source driving impedance or the receive back termination.

Figure 5:
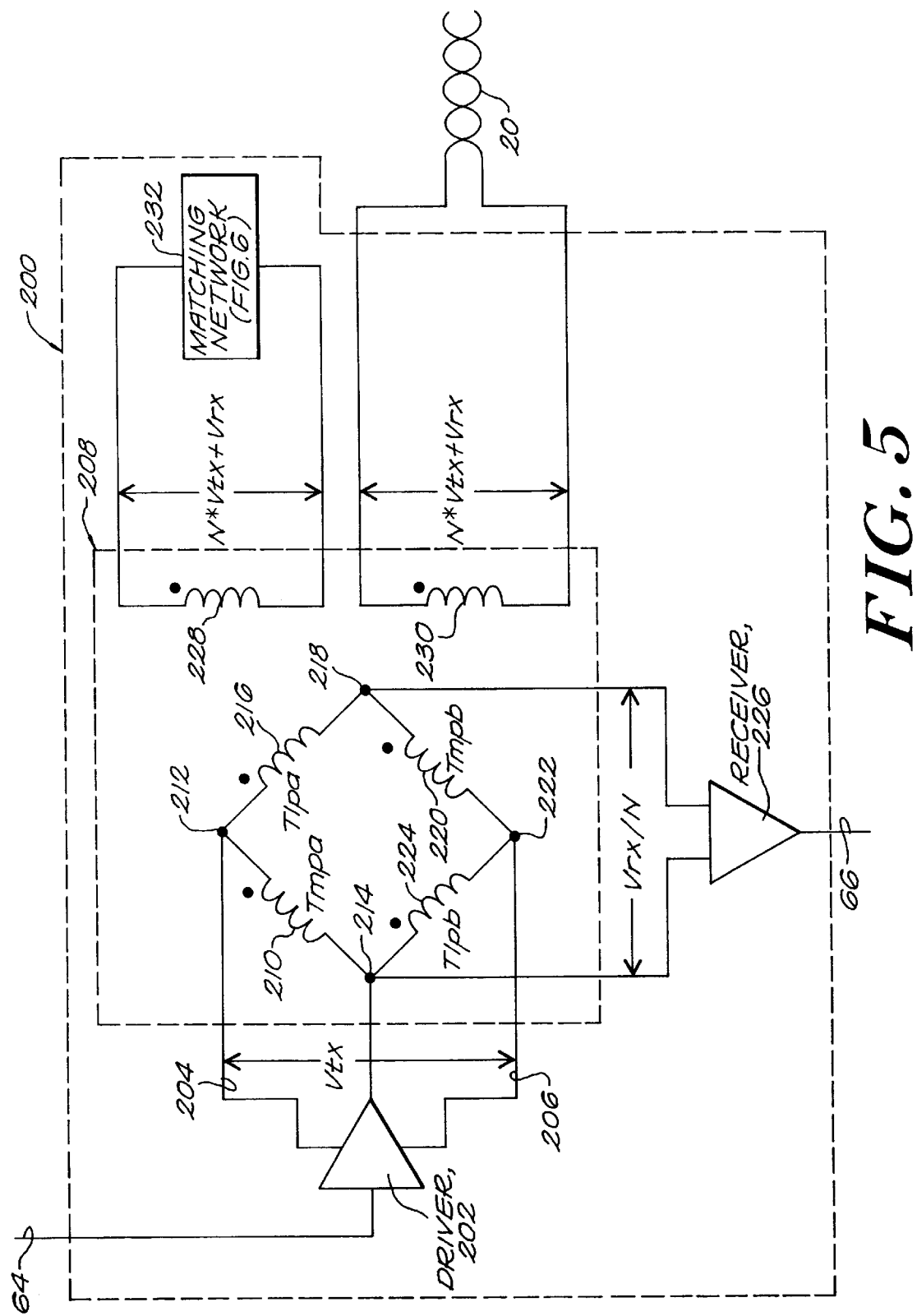
FIG. 5 is a schematic illustration of an alternative embodiment hybrid.

FIG. 5 is a schematic illustration of an alternative embodiment hybrid 200. The hybrid 200 includes a driver 202 which receives the filtered transmit signal on the line 64 and provides a differential signal $V_{tx}$ across lines 204, 206. The hybrid 200 also includes a transformer bridge circuit 208. A first leg of the bridge 208 comprises a first primary winding 210 of a first transformer connected between a first node 212 and a second node 214. A second leg includes a first primary winding 216 of a second transformer connected between the first node 212 and a third node 218. A third leg comprises a second primary winding 220 of the first transformer connected between the third node 218 and a fourth node 222, and a fourth leg includes a second primary winding 224 of the second transformer connected between the second node 214 and the fourth node 222. The driver 202 applies a transmit signal $V_{tx}$ across the first and fourth nodes 212, 222, while a receive amplifier 226 receives a receive signal between the second and third nodes 214, 216.

A secondary winding 228 of the first transformer is magnetically coupled to the first and second primary windings 210, 220 respectively, of the first transformer. A secondary winding 230 of the second transformer is electrically coupled to the telephone line 20 and magnetically coupled to the first and second primary windings 216, 224 of the second transformer. Significantly, an impedance matching network 232 is coupled across the secondary winding 228 of the first transformer.

Figure 6:
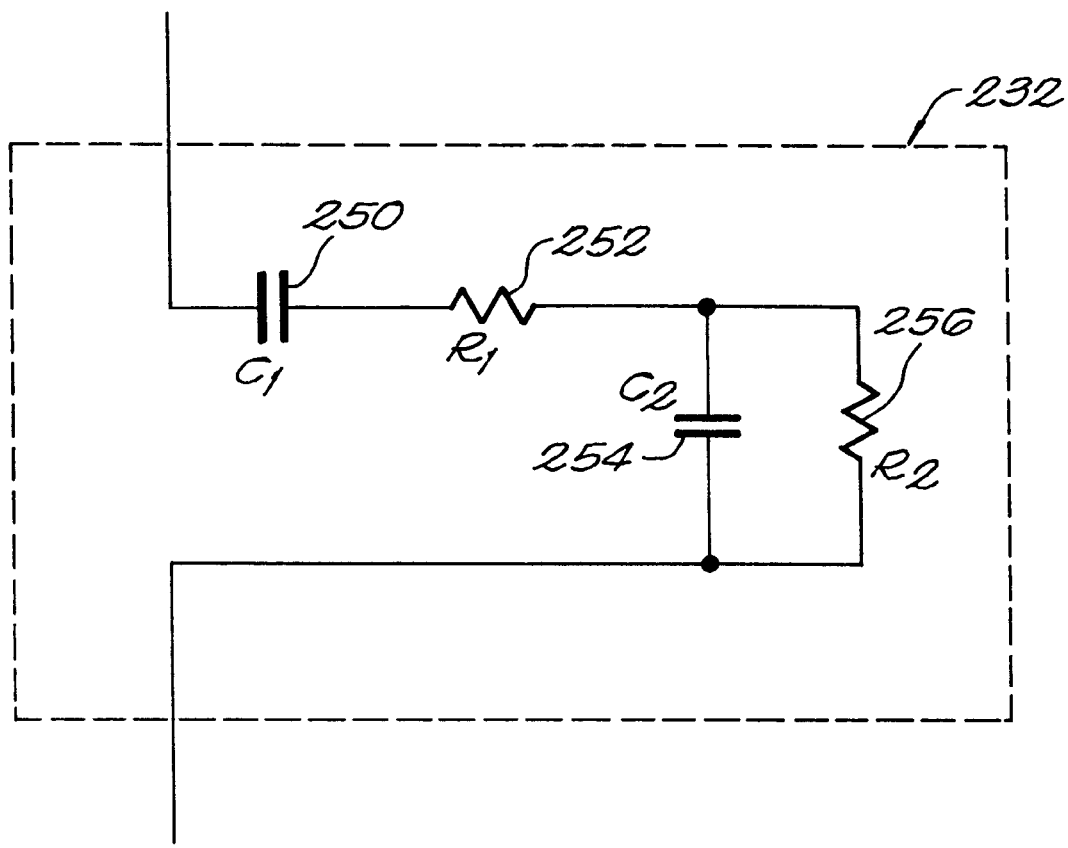
FIG. 6 is a schematic illustration of a matching network for use in the hybrid of FIG. 5.

FIG. 6 is a schematic illustration of a matching network for use in the hybrid of FIG. 5. The matching network 232 includes a capacitor $C_1$ 250, a resistor $R_1$ 252, a capacitor $C_2$ 254 and a resistor $R_2$ 256. Representative values include $C_1$=47 nf, $R_1$=105 ohms, $C_2$=44 nf and $R_2$=309 ohms. This matching network is tuned for a standard test loop referred to as CSA6 (9000 feet of AWG#26) with a 0.1 $\mu f$ capacitor in series with tip and ring, and a loop termination of 100 ohms.

Figure 7:
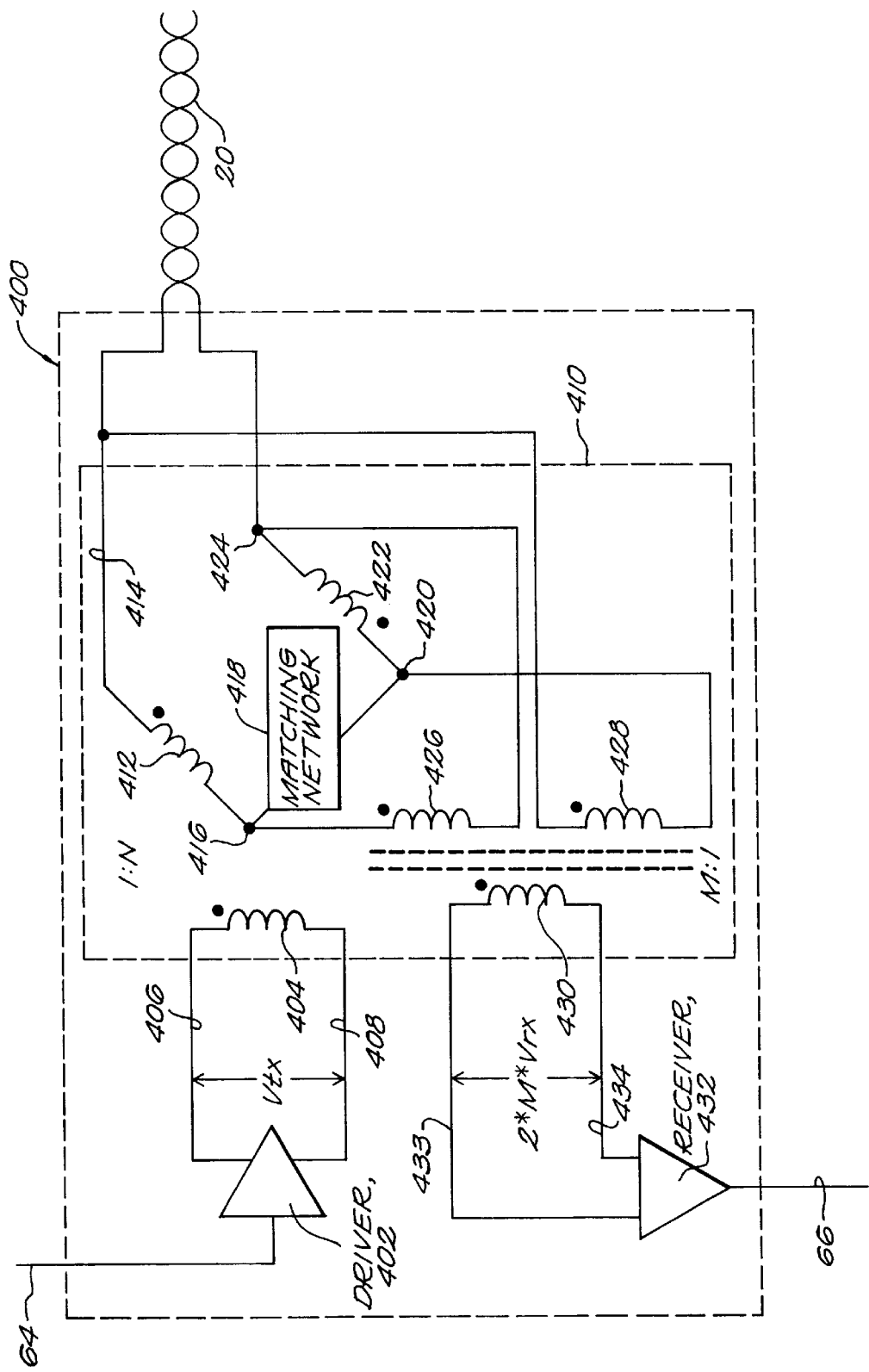
FIG. 7 is a schematic illustration of yet another alternative embodiment hybrid.

FIG. 7 is a schematic illustration of yet another alternative embodiment hybrid 400 for coupling a broadband modem to a telephone line. This hybrid includes a driver 402 which receives the signal on the line 64 and provides a drive signal Vtx across a primary inductor 404 via lines 406, 408. The hybrid 400 also includes a transformer bridge 410 comprising a first secondary winding 412 of a first transformer connected between a first node 414 and a second node 416. The bridge also comprises an impedance matching network 418 connected between the second node 416 and a third node 420, and a second secondary winding 422 of the first transformer connected between the third node 420 and a fourth node 424. A first winding 426 of a second transformer is connected between the second and fourth nodes 416, 424, and a second primary winding 428 of the second transformer is connected between the first and third nodes 414, 420. The second primary winding 428 is electrically coupled to the telephone line 20 and magnetically coupled to a secondary 430 of the second transformer. A receiver 432 senses the signal across the secondary winding 430 and provides the signal on the line 66 indicative thereof.

A benefit of this topology is that the respective gain from the driver lines 406, 408 to the lines 414, 424 and the gain from the lines 414, 424 to input lines 433, 434 of the receiver 432 are completely independent. That is, the turns ratio of the first transformer can be set independent to control the transmit and receive gain.

Although the present invention has been shown and described with respect to several preferred embodiments thereof, various changes, omissions and additions to the form and detail thereof, may be made therein, without departing from the spirit and scope of the invention.

What is claimed is:

1. A hybrid circuit which couples a broadband modem to a telephone line, said hybrid circuit comprising:
   a transformer bridge circuit including
   i) a first leg comprising a first impedance matching network connected between a first node and a second node;
   ii) a second leg comprising a first primary winding connected between said first node and a third node;
   iii) a third leg comprising a second impedance matching network connected between said third node and a fourth node;
   iv) a fourth leg comprising a second primary winding connected between said second node and said fourth node;
   a drive amplifier which applies a transmit signal from the modem across said first and fourth nodes;
   a secondary winding magnetically coupled to said first and second primary windings and electrically coupled to the telephone line; and
   a receive amplifier which receives a receive signal between said second and third nodes and provides a receive signal indicative thereof.

2. The hybrid circuit of claim 1, wherein said first and second matching networks have equal impedance values.

3. The hybrid circuit of claim 1, wherein said first and second matching networks each have an impedance which is equal to about one-half of the telephone line impedance as seen from said hybrid.

4. The hybrid circuit of claim 3, wherein said first transformer has a turns ratio of about one.

5. A hybrid circuit which couples a broadband modem to a telephone line, said hybrid circuit comprising:
   a bridge circuit including
   i) a first leg comprising a first primary winding of a first transformer connected between a first node and a second node;
   ii) a second leg comprising a first primary winding of second transformer connected between said first node and a third node;
   iii) a third leg comprising a second primary winding of said first transformer connected between said third node and a fourth node;
   iv) a fourth leg comprising a second primary winding of said second transformer connected between said second node and said fourth node;
   a drive amplifier which applies a transmit signal from the modem across said first and fourth nodes;
   a secondary winding of said first transformer magnetically coupled to said first and second primary windings of said first transformer;
   a secondary winding of said second transformer magnetically coupled to said first and second primary windings of said second transformer and electrically coupled to the telephone line;
   a receive amplifier which receives a receive signal between said second and third nodes and provides a receive signal indicative thereof; and
   an impedance matching network coupled across said secondary winding of said first transformer.

6. The hybrid circuit of claim 5, wherein said impedance matching network has an impedance equal to the impedance of the telephone line.

7. The hybrid circuit of claim 5, wherein said hybrid couples an ADSL modem to the telephone line.

8. A hybrid circuit which couples a broadband modem to a telephone line, said hybrid circuit comprising:
   a bridge circuit including
   i) a first leg comprising a first secondary winding of a first transformer connected between a first node and a second node;
   ii) a second leg comprising an impedance matching network connected between said second node and a third node;
   iii) a third leg comprising a second secondary winding of said first transformer connected between said third node and a fourth node;
   iv) a fourth leg comprising a first primary winding of a second transformer connected between said second node and said fourth node;
   a second primary winding of said second transformer connected between said first and third nodes;
   a secondary winding of said second transformer across which a received signal is sensed;
   a primary winding of said first transformer that receives a transmit signal and is magnetically coupled to said first and second secondary windings of said first transformer; and
   wherein said second primary winding of said second transformer is electrically coupled to the telephone line and magnetically coupled to said secondary of said second transformer, and the telephone line is electrically connected to said first and fourth nodes.

9. The hybrid circuit of claim 8, further comprising:
   a drive amplifier which provides said transmit signal; and
   a receive amplifier which senses said received signal across said secondary winding of said second transformer and provides a received signal indicative thereof.

10. The hybrid circuit of claim 8, wherein said matching network comprises a plurality of passive components.

11. A digital subscriber loop modem, comprising:
    a transmit circuit that provides a modem transmit signal;
    a receive circuit;
    a hybrid circuit which couples the modem to a telephone line, said hybrid circuit comprising
    a transformer bridge circuit including
    i) a first leg comprising a first impedance matching network connected between a first node and a second node;
    ii) a second leg comprising a first primary winding connected between said first node and a third node;
    iii) a third leg comprising a second impedance matching network connected between said third node and a fourth node;
    iv) a fourth leg comprising a second primary winding connected between said second node and said fourth node;
    a drive amplifier which applies a signal indicative of said modem transmit signal across said first and fourth nodes;
    a secondary winding magnetically coupled to said first and second primary windings and electrically coupled to the telephone line; and
    a receive amplifier which receives a receive signal between said second and third nodes and provides a receive signal indicative thereof to said receive circuit.

* * * * *

UNITED STATES PATENT AND TRADEMARK OFFICE
CERTIFICATE OF CORRECTION

PATENT NO : 6,163,579
DATED : 12/19/00
INVENTOR(S): Brian Harrington, Scott Wurcer It is certified that error appears in the above-identified patent and that said Letters Patent is hereby corrected as shown below:

ON THE TITLE PAGE

Please amend the title to read:

"BROADBAND MODEM TRANSFORMER HYBRID."

Signed and Sealed this

Twenty-ninth Day of May, 2001

Attest:

NICHOLAS P. GODICI

*Attesting Officer*  *Acting Director of the United States Patent and Trademark Office*